Aug. 7, 1956 R. W. CHAPMAN 2,757,841
APPARATUS FOR PRODUCING A SOIL PACKED FLOWER MOLD
Filed April 6, 1954
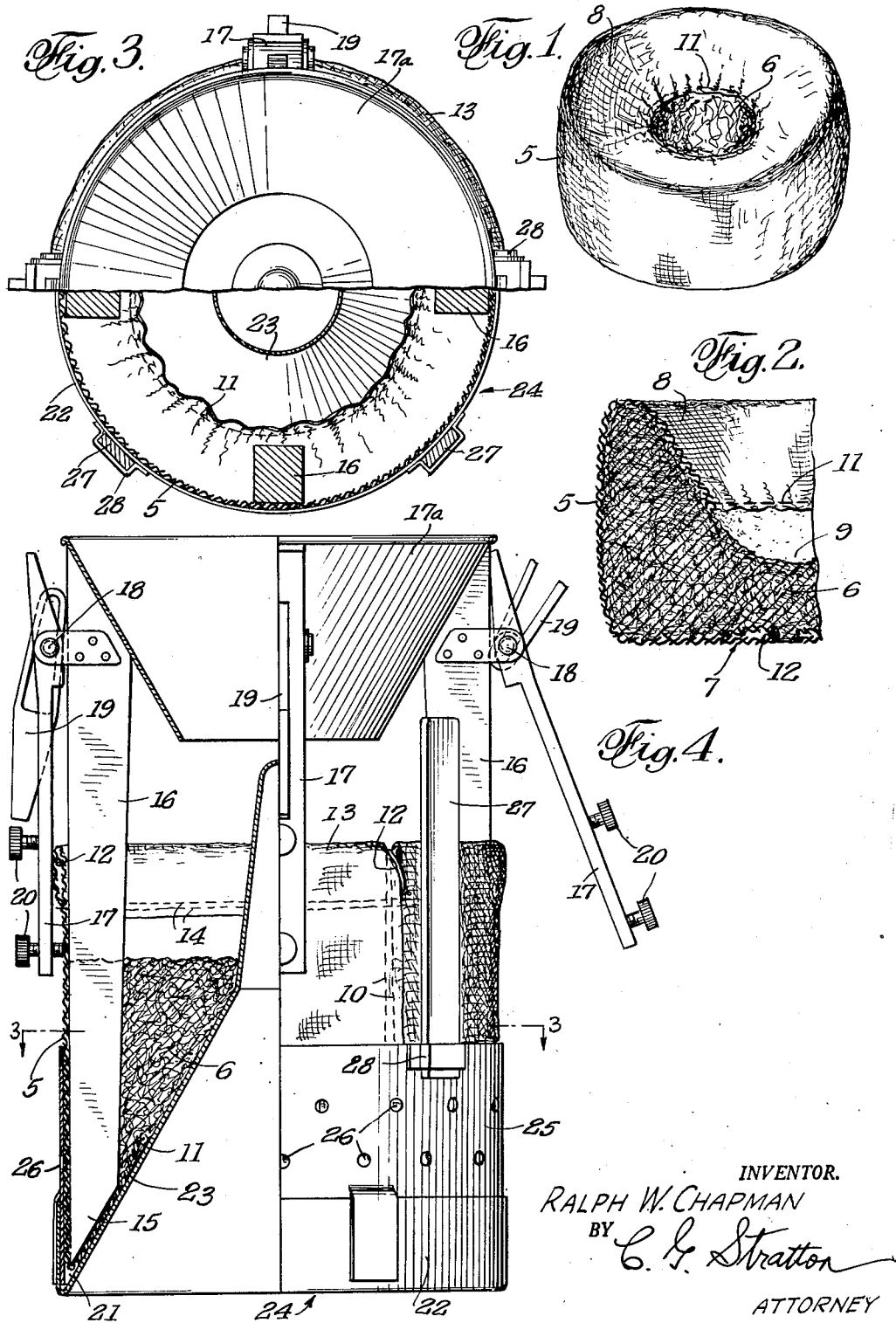
INVENTOR.
RALPH W. CHAPMAN
BY C. G. Stratton
ATTORNEY

United States Patent Office 2,757,841
Patented Aug. 7, 1956

2,757,841

APPARATUS FOR PRODUCING A SOIL PACKED FLOWER MOLD

Ralph W. Chapman, Camarillo, Calif.

Application April 6, 1954, Serial No. 421,306

5 Claims. (Cl. 226—58)

This invention relates to a flower pot construction and to apparatus and method for producing the same.

An object of the present invention is to provide a novel flower or seed-growing unit that inexpensively combines a device capable of being used both as a flower pot and as a means for placing a growing plant in the ground without disturbing the root system thereof.

Another object of the invention is to provide a novel method for producing the unit above mentioned.

A further object of the invention is to provide new and improved apparatus for aiding the carrying out of the present method.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes, one embodiment of the present invention, which is given by way of illustration or example only.

In the drawing, like reference characters designate similar parts in the several views.

Fig. 1 is a perspective view of a flower-growing or seed-germinating unit according to the present invention.

Fig. 2 is an enlarged fragmentary cross-sectional view of the unit shown in Fig. 1.

Fig. 3 is a plan view, partly in cross-section on line 3—3 of Fig. 4, of apparatus employed to produce the unit shown in Figs. 1 and 2.

Fig. 4 is a partial elevational and partial vertical sectional view of said apparatus.

The flower-growing or seed-germinating unit that is illustrated in Figs. 1 and 2 comprises a coarse-mesh fabric container 5 filled with soil 6. Said unit is preferably of cylindrical form, has a flat bottom 7, and an upper inturned or dished face 8. Said fabric container encloses all of the upper dished face except the central portion 9 which is open and exposes soil 6.

The fabric container is advantageously made of burlap or the like and, accordingly, is quite foraminous or porous, light-weight, strong, and inexpensive. Also, burlap has the property of rotting or deteriorating when in the ground and subject to successive moistenings.

The term "soil" is here used to designate any mixture of sand, clay, humus, peat moss, fertilizer, etc. that is used to make up the soil 6. As will later be seen, the soil, regardless of its composition, is filled into container 5 either dry or in the presence of moisture and, therefore, becomes sufficiently hard and form-retaining to be handleable.

The unit thus provided may be planted with a seed, bulb, etc. or with a transplanted shoot in which, in the first instance, germination may take place and, in the second, increasing growth of the plant. This unit with a growing plant therein may be placed in the ground or in a ceramic pot, flower box, etc. In other words, the unit provided herein may be used by nurserymen in various ways and including all of the ways that potted plants are used.

Said unit may be produced in the following simple manner. The fabric container 5 is first made up as a sleeve by stitching the side edges together as at 10. One end of the tube of fabric thus provided is gathered or shirred by a line of stitching 11 to constrict the size of said end. The other end of said tube is provided with a draw or puckering string 12 that is enclosed in an end fold 13 stitched in place by lines of stitching 14.

The tube thus provided is strung on the tapered ends 15 of a set of uniformly spaced fingers 16 that extend in parallel relation from the reduced end of a conical funnel 17a. This may be done with the large end of said funnel on a support with fingers 16 extending upwardly to receive the burlap tube end fold 13 first. The ruffled or gathered end of the tube will limit the position of the sleeve.

Then, the sleeve is clamped to said fingers by clamp bars 17 pivotally mounted on said fingers, as at 18, said bars being moved into clamping position on said pivots and held in such position by wedges 19. Finger screws or bolts 20, carried by bars 17, may be turned in to grip the sleeve in the manner shown. Each bar 17 may be provided with two such screws or bolts, differently spaced from the ends to enable clamping of the folded end of longer or shorter sleeves.

When the sleeve is thus mounted, the funnel 17a and fingers 16 are inverted to the position of Fig. 3 and the tapered ends 15 of fingers 16 are fitted into the acute-angled spaces 21 defined between a flange 22 and a conical core 23 of a base member 24. In so doing, the gathered or shirred end of the burlap sleeve is made to conform to the core 23 and, therefore, assumes a conical disposition, as shown.

To provide further support for the burlap sleeve, the base member 24 is provided with a cuff 25 that comprises an extension of sleeve 22. Said cuff may comprise a two-part sleeve that can be enclosed around the burlap sleeve. The same may be provided with perforations 26. Since said cuff should be kept clear of clamp bars 17, the actual height thereof may be kept low but the effective height increased by stakes 27 that are removably held in sockets 28 on the cuff.

Since the burlap sleeve is spread from within by fingers 16 and retained from the outside by cuff 25 or said cuff and extension stakes 27, when soil is deposited through funnel 17a into the space 21, the same fills said space to the level desired. Such soil filling is preferably done with the soil in a dry state or in the presence of water which is effective, through perforations 26, to moisten and thereby properly compact the soil. When filled dry, water may be used after string 12 is drawn up. Moisture may be provided in different ways. For instance, during or after placing the soil in the burlap sleeve, steam may be directed into the soil to not only moisten the same but also destroy undesired insects, even to the point of sterilizing said soil. Thereafter, beneficial bacteria may be reintroduced to render the soil propagating.

After the soil 6 has been filled in, the unit comprising funnel 17a and fingers and clamps 16 and 17 is removed, i. e., extracted from the burlap sleeve. Now, the draw string 12 is drawn to pull the open end of the sleeve over the upper surface of the soil. This becomes the bottom 7 of the planter unit, as seen in Fig. 2. Finally, the filled sleeve is removed from base 24 and only slight finger manipulation is required to effect the slight reformation of the soil from the condition of Fig. 4 to that of Fig. 2. When the soil has become partly dried, the same will be form-retaining and will be adapted to the different uses herein mentioned.

While the foregoing has illustrated and described what is now contemplated to be the best mode of carrying out the invention, the construction is, of course, subject to modification without departing from the spirit and scope of the invention. It is, therefore, not desired to restrict the invention to the particular form of construction illustrated and described, but to cover all modifications that may fall within the scope of the appended claims.

Having thus described the invention, what is claimed and desired to be secured by Letters Patent is:

1. Apparatus for producing a soil-packed fabric sleeve, comprising a set of fingers circumferentially positioned around said fabric sleeve, said sleeve having a constricted bottom end trained inwardly over the ends of said fingers, clamp means for holding said sleeve on said fingers, a funnel in concentric relationship with respect to and mounting said fingers, and a base having a conical core, said fingers normally resting on said core for supporting said sleeve in coaxial relationship with respect to said core during the soil-filling operation of said sleeve.

2. Apparatus according to claim 1: a cuff extending upwardly from the base around said fabric sleeve to confine the same during filling in of the soil.

3. Apparatus for producing a soil-packed flower mold, comprising a porous fabric sleeve having one end of said sleeve shirred for reducing its diameter, and the other end of said sleeve provided with a draw or puckering string, a funnel member, means extending coaxially of said funnel member defining a cylindrical locus whose diameter is substantially equal to the diameter of said sleeve, clamping means for supporting said sleeve on said coaxial means in transversely and longitudinally stretched position, and a truncated cone base, with the truncated apex of said cone facing the opening in said funnel member, said cone base and said funnel member being held in spaced coaxial position with respect to each other by said coaxial means, and said shirred portion of said sleeve being bent inwardly upon the surface of said truncated cone, whereby soil may be packed against the surface of said truncated cone and the shirred portion of said sleeve by pouring said soil through said funnel.

4. Apparatus for producing a soil-packed flower mold in the form of a cylinder with a re-entrant truncated cone recess, said apparatus comprising a truncated cone base corresponding to said recess, a funnel member, finger means for supporting said funnel member in spaced, coaxial relationship with respect to said base, a fabric sleeve held in position on said finger means between said base and said funnel member, the bottom portion of said sleeve being shirred and bent over for engaging the conical surface of said base, and the upper portion of said sleeve having a puckering string for closing off said sleeve upon filling in said sleeve with said soil through said funnel.

5. Apparatus for producing a soil-packed flower mold in the form of a cylinder with a re-entrant truncated cone recess, said apparatus comprising a truncated cone base corresponding to said recess, a fabric sleeve having top and bottom portions, said bottom portion being shirred and bent inwardly and over for engaging the cone-shaped surface of said base, a puckering string at the top portion of said sleeve for closing off said sleeve upon filling in said sleeve with said soil, an outer wall mounted on said base, said wall being shaped substantially as a hollow cylinder, said wall acting as a lateral support for said sleeve when said soil is packed into said sleeve, funnel means for introducing soil into said sleeve, said means being a rigid member having a rigid wall and open ends, and finger means spacing said funnel means in coaxial relationship to said base.

References Cited in the file of this patent

UNITED STATES PATENTS

| 8,625 | Bushnell | Jan. 6, 1852 |
| 55,063 | Cook | May 29, 1866 |
| 1,200,396 | Southard | Oct. 3, 1916 |
| 1,994,553 | Wolcott | Mar. 19, 1935 |
| 2,259,866 | Stokes | Oct. 21, 1941 |
| 2,531,795 | Walter | Nov. 28, 1950 |

FOREIGN PATENTS

| 6,593 | Great Britain | Apr. 17, 1889 |
| 46,639 | Norway | June 24, 1929 |
| 981,148 | France | Jan. 10, 1951 |